(12) United States Patent
Yamashiro et al.

(10) Patent No.: US 12,355,051 B2
(45) Date of Patent: Jul. 8, 2025

(54) POWER SUPPLY DEVICE, ELECTRIC VEHICLE COMPRISING SAID POWER SUPPLY DEVICE, AND POWER STORAGE DEVICE

(71) Applicant: SANYO Electric Co., Ltd., Osaka (JP)

(72) Inventors: Go Yamashiro, Hyogo (JP); Hiroyuki Takahashi, Hyogo (JP); Kazuhiro Harazuka, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 664 days.

(21) Appl. No.: 17/619,977

(22) PCT Filed: Apr. 20, 2020

(86) PCT No.: PCT/JP2020/016990
§ 371 (c)(1),
(2) Date: Dec. 16, 2021

(87) PCT Pub. No.: WO2020/261727
PCT Pub. Date: Dec. 30, 2020

(65) Prior Publication Data
US 2022/0359926 A1    Nov. 10, 2022

(30) Foreign Application Priority Data

Jun. 28, 2019   (JP) .................................. 2019-122484

(51) Int. Cl.
*H01M 10/658*   (2014.01)
*H01M 50/103*   (2021.01)
(Continued)

(52) U.S. Cl.
CPC ....... *H01M 10/658* (2015.04); *H01M 50/209* (2021.01); *H01M 50/249* (2021.01);
(Continued)

(58) Field of Classification Search
CPC ............. H01M 10/658; H01M 50/249; H01M 50/262; H01M 50/289; H01M 50/209;
(Continued)

(56) References Cited

U.S. PATENT DOCUMENTS

2014/0014420 A1*  1/2014  Nakamura .......... H01M 10/647
                                                      180/65.1
2015/0144409 A1    5/2015  Fujii
(Continued)

FOREIGN PATENT DOCUMENTS

CN         202695676 U      1/2013
JP         2008-305577     12/2008
(Continued)

OTHER PUBLICATIONS

EPO machine generated English translation of WO-2014034107-A1 (Year: 2014).*
(Continued)

*Primary Examiner* — Sean P Cullen
*Assistant Examiner* — Kimberly Wyluda
(74) *Attorney, Agent, or Firm* — WHDA, LLP

(57) ABSTRACT

A power supply device includes a plurality of battery cells each having a prismatic exterior can, heat-shrinkable films having insulating property and each covering one of the plurality of battery cells, a plurality of separators interposed between the plurality of battery cells, a battery stack constituted by the plurality of battery cells stacked with separators interposed between the plurality of battery cells, a pair of end plates disposed on both end faces of the battery stack, and a plurality of bind bars disposed on side surfaces, facing opposite directions, of the battery stack to fasten the end plates to each other, where an edge of an end edge of each separator is broken.

8 Claims, 12 Drawing Sheets

(51) Int. Cl.
*H01M 50/209* (2021.01)
*H01M 50/249* (2021.01)
*H01M 50/262* (2021.01)
*H01M 50/289* (2021.01)
*H01M 50/293* (2021.01)
*H01M 50/431* (2021.01)
*H01M 50/44* (2021.01)
*H01M 50/121* (2021.01)

(52) U.S. Cl.
CPC ....... *H01M 50/262* (2021.01); *H01M 50/289* (2021.01); *H01M 50/293* (2021.01); *H01M 50/103* (2021.01); *H01M 50/121* (2021.01); *H01M 50/431* (2021.01); *H01M 50/44* (2021.01); *H01M 2220/20* (2013.01)

(58) Field of Classification Search
CPC .. H01M 50/293; H01M 50/121; H01M 50/44; H01M 50/103; H01M 50/431; H01M 2220/20
See application file for complete search history.

(56) References Cited

U.S. PATENT DOCUMENTS

| | | | |
|---|---|---|---|
| 2015/0349302 A1* | 12/2015 | Baek | H01M 50/147 429/185 |
| 2020/0161600 A1 | 5/2020 | Abe | |

FOREIGN PATENT DOCUMENTS

| | | | |
|---|---|---|---|
| JP | 2012-084347 A | 4/2012 | |
| JP | 2015-060759 | 3/2015 | |
| JP | 2016-046233 | 4/2016 | |
| JP | 2018-029068 | 2/2018 | |
| KR | 20150111160 A * | 10/2015 | |
| WO | 2014/034079 | 3/2014 | |
| WO | WO-2014034107 A1 * | 3/2014 | ............ B60L 11/126 |
| WO | 2019/082509 A1 | 5/2019 | |

OTHER PUBLICATIONS

EPO machine generated English translation of KR-20150111160-A (Year: 2015).*
EPO machine generated English translation of JP-2015060759-A (Year: 2015).*
International Search Report of PCT application No. PCT/JP2020/016990 dated Jun. 30, 2020.
English Translation of Chinese Search Report dated Feb. 7, 2023 for the related Chinese Patent Application No. 202080033343.1.

* cited by examiner

POWER SUPPLY DEVICE, ELECTRIC VEHICLE COMPRISING SAID POWER SUPPLY DEVICE, AND POWER STORAGE DEVICE

CROSS-REFERENCE TO RELATED APPLICATIONS

This application is a U.S. national stage application of the PCT International Application No. PCT/JP2020/016990 filed on Apr. 20, 2020, which claims the benefit of foreign priority of Japanese patent application No. 2019-122484 filed on Jun. 28, 2019, the contents all of which are incorporated herein by reference.

TECHNICAL FIELD

The present invention relates to a power supply device including a number of stacked battery cells, an electric vehicle including the power supply device, and a power storage device.

BACKGROUND ART

A power supply device including a large number of stacked battery cells is used for a power supply device for making an electric vehicle travel, a power supply device for power storage, and the like. In such a power supply device, a plurality of chargeable and dischargeable battery cells are stacked, and insulating separators are interposed between the battery cells. A configuration for insulating the surface of a battery cell is known in which the surface except an upper surface provided with an electrode terminal is covered with a thin heat-shrinkable film (for example, Patent Literature 1). Battery cells expand by charging and discharging. With the recent demand for higher capacity of battery cells, the amount of expansion of each cell has become greater. Such expansion and contraction apply an excessive stress to the thin heat-shrinkable film.

Meanwhile, for higher output and capacity required of power supply devices, the number by which battery cells are stacked is growing, and a higher heat insulating performance has been required of separators to avoid the heat of a battery cell affecting other battery cells. As a separator having a high heat insulating property, a separator using a heat insulating material composed of an inorganic powder and a fiber base material has been developed. As such a separator, for example, a separator in which silica aerogel having an extremely low heat conductivity of 0.02 W/m·K is filled in gaps in a fiber sheet is employed, manifesting excellent heat insulation characteristics.

This heat insulating material has an excellent heat insulating property but has poor stretchability, and thus does not expand and contract along with the expansion and contraction of the battery cell. As illustrated in a schematic cross-sectional view in FIG. 12, when heat-shrinkable film 105 expands and contracts due to expansion and contraction of battery cell 101, heat-shrinkable film 105 may rupture by edge part 106 at an end edge of heat insulating material 102. A heat insulating material containing an inorganic powder, in particular, disadvantageously damages a heat-shrinkable film more easily since, for example, such a heat insulating material may have a sharp edge on a cut face of an end edge and the contained inorganic powder may expose itself on the surface of the heat insulating material.

CITATION LIST

Patent Literature

PTL 1: Unexamined Japanese Patent Publication No. 2015-60759 A

SUMMARY OF THE INVENTION

An object of the present invention is to provide a technique of protecting a heat-shrinkable film covering a battery cell when the battery cell is used under a condition where the battery cell is subjected to repeated expansion and contraction.

A power supply device according to an aspect of the present invention includes a plurality of battery cells 1 each having prismatic exterior can 11, heat-shrinkable films 5 having insulating property and each covering one of the plurality of battery cells 1, a plurality of separators 2 interposed between the plurality of battery cells 1, battery stack 10 constituted by the plurality of battery cells 1 stacked with the plurality of separators 2 interposed between the plurality of battery cells 1, a pair of end plates 3 disposed on both end faces of battery stack 10, and a plurality of bind bars 4 disposed on side surfaces, facing opposite directions, of battery stack 10 to fasten end plates 3 to each other, wherein an edge of an end edge of each of the plurality of separators 2 is broken.

An electric vehicle according to an aspect of the present invention includes power supply device 100 described above, motor 93 for traction, power being supplied to motor 93 from power supply device 100, vehicle body 91 with power supply device 100 and motor 93 mounted thereon, and wheels 97 driven by motor 93 to make vehicle body 91 travel.

A power storage device according to an exemplary embodiment of the present invention includes power supply device 100 described above, and power supply controller 88 that controls charging and discharging of power supply device 100, and power supply controller 88 performs such a control that enables charging of battery cell 1 with power from external and charges battery cell 1.

A power supply device described above can protect a heat-shrinkable film covering a battery cell when the battery cell is used under a condition where the battery cell is subjected to repeated expansion and contraction.

DESCRIPTION OF EMBODIMENTS

Figure 1:
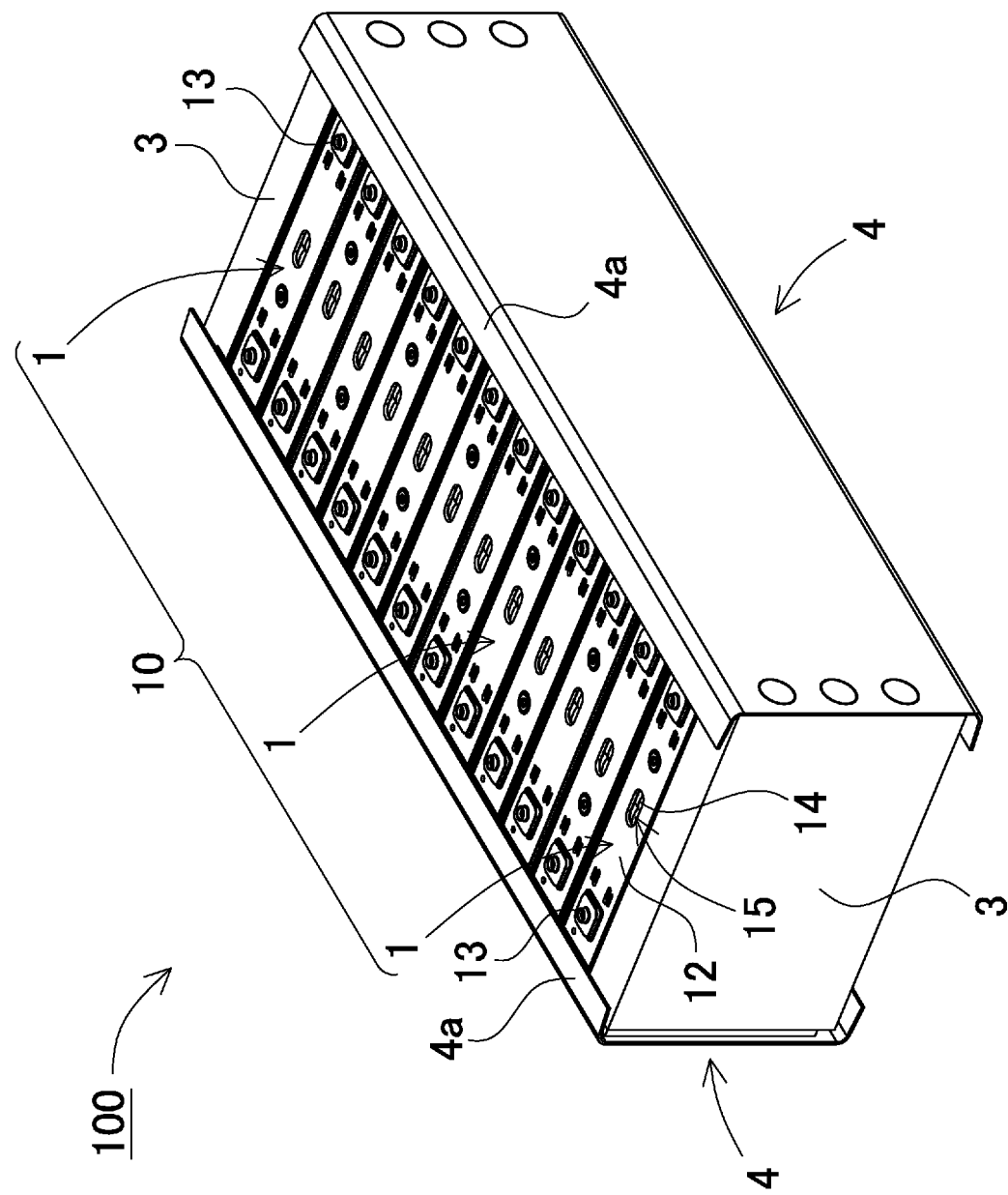
FIG. 1 is a perspective view of a power supply device according to one exemplary embodiment of the present invention.

A power supply device according to a first exemplary embodiment of the present invention includes a plurality of battery cells each having a prismatic exterior can, heat-shrinkable films having insulating property and each covering one of the plurality of battery cells, a plurality of separators interposed between the plurality of battery cells, a battery stack constituted by the plurality of battery cells stacked with the plurality of separators interposed between the plurality of battery cells, a pair of end plates disposed on both end faces of the battery stack, and a plurality of bind bars disposed on side surfaces, facing opposite directions, of the battery stack to fasten the end plates to each other, wherein an edge of an end edge of each of the plurality of separators is broken.

In the configuration described above, the edge of the end face of the separator is broken instead of left with a sharp cut surface, so that even under expansion of the battery cell, rupture of the heat-shrinkable film caused by stress concentration at the end edge can be avoided or suppressed.

In a power supply device according to a second exemplary embodiment of the present invention, a separator is disposed on the outer side of a heat-shrinkable film covering a battery cell.

In the configuration described above, contact between the inner surface of the heat-shrinkable film and the end face of the separator, which contact may easily cause stress concentration, can be avoided, whereby the heat-shrinkable film can be protected.

In a power supply device according to a third exemplary embodiment of the present invention, a separator is sandwiched between adjacent battery cells, and broken edges are provided along outer peripheral edges of stack planes on both sides of the separator.

In the configuration described above, since the broken edges are provided on the outer peripheral edges of the stack planes on both sides of the separator, a heat-shrinkable films disposed to oppose each of the stack planes can be protected.

In a power supply device according to a fourth exemplary embodiment of the present invention, a separator is disposed in the inner side of a heat-shrinkable film covering a battery cell.

In the configuration described above, covering the battery cell and the separator with the heat-shrinkable film allows the battery cell and the separator to be handled easily as an integrated structure during assembly of the power supply device.

A power supply device according to a fifth exemplary embodiment of the present invention further includes an adhesive layer between each of a plurality of separators and a heat-shrinkable film opposing the separator, the adhesive layer being made of a material having higher flexibility and stretchability than the separator.

In the configuration described above, even under expansion of the battery cell, the flexible adhesive layer deforms along with the deformation of the battery cell, and damage to the separator fixed by the adhesive layer can be avoided or suppressed.

A power supply device according to a sixth exemplary embodiment of the present invention further includes an adhesive layer between each of a plurality of separators and a battery cell opposing the separator, the adhesive layer being made of a material having a higher flexibility and stretchability than the separator.

In the configuration described above, when the battery cell expands, the flexible adhesive layer deforms along with the deformation of the battery cell, and damage to the separator fixed to the battery cell via the adhesive layer can be avoided or suppressed.

In a power supply device according to a seventh exemplary embodiment of the present invention, the separator is made of a hybrid material of an inorganic powder and a fibrous reinforcing material. Furthermore, in a power supply device according to an eighth exemplary embodiment of the present invention, the inorganic powder is silica aerogel. In the power supply device described above, heat conductivity of the separator can be reduced to improve heat insulation characteristics.

Hereinafter, the present invention will be described in detail with reference to the drawings. In the following description, terms indicating specific directions or positions (for example, "top", "bottom", and other terms including those terms) are used as necessary. However, the use of those terms is for facilitating the understanding of the invention with reference to the drawings, and the technical scope of the present invention is not limited by the meanings of the terms. Parts denoted by the same reference mark in a plurality of drawings indicate an identical or equivalent parts or member.

The exemplary embodiments described below illustrate specific examples of the technical concept of the present invention, and do not limit the present invention to the exemplary embodiments described below. Unless otherwise specified, dimensions, materials, shapes, relative positions, and the like of the components described below are not intended to limit the scope of the present invention thereto, but are intended to be illustrative. The contents described in one exemplary embodiment and example are also applicable to other exemplary embodiments and examples. The sizes, positional relationships, and the like of members illustrated in the drawings may be exaggerated in order to clarify description.

First Exemplary Embodiment

Figure 2:
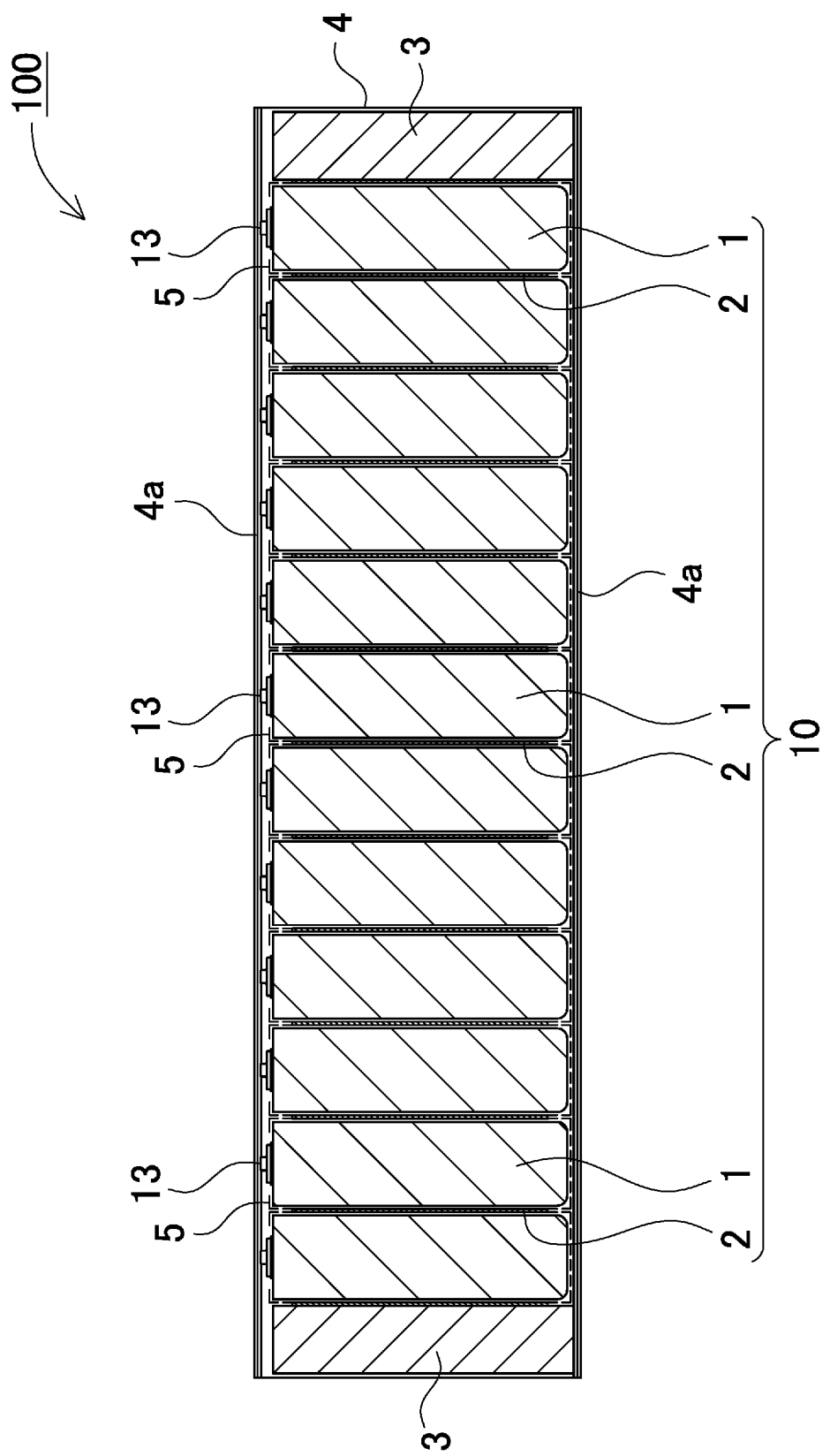
FIG. 2 is a vertical sectional view of the power supply device illustrated in FIG. 1.
Figure 3:
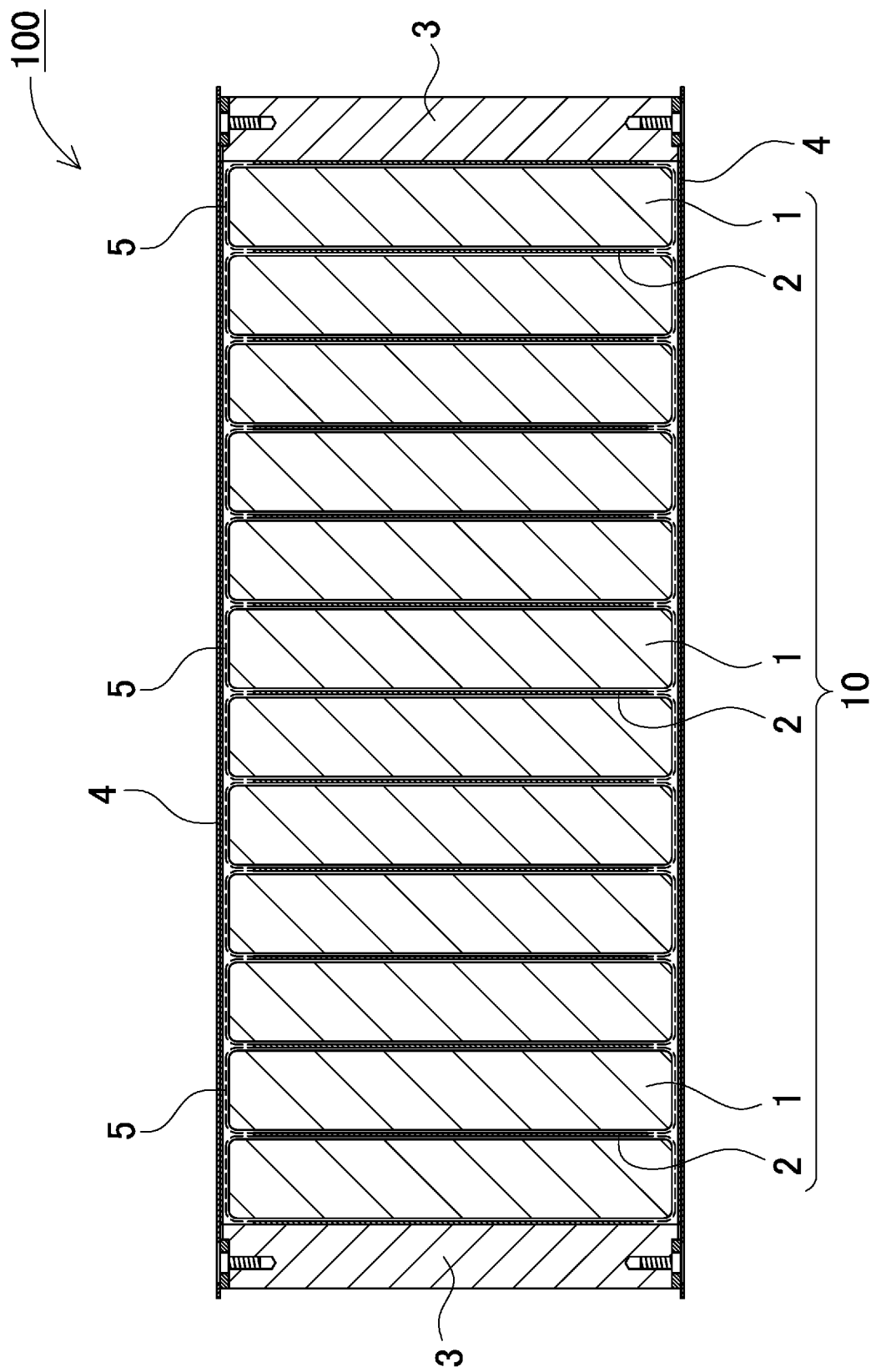
FIG. 3 is a horizontal sectional view of the power supply device illustrated in FIG. 1.

FIG. 1 is a perspective view, FIG. 2 is a vertical sectional view, and FIG. 3 is a horizontal sectional view of power supply device 100 according to a first embodiment of the present invention. Power supply device 100 illustrated in these drawings includes a plurality of battery cells 1 each having prismatic exterior can 11, insulating films 5 each covering one of the plurality of battery cells 1, a plurality of separators 2 interposed between the plurality of battery cells 1, a pair of end plates 3 disposed on both end faces of battery stack 10 constituted by the plurality of battery cells 1 stacked with the separators 2 interposed between battery cells 1, and a plurality of bind bars 4 disposed on side surfaces, facing opposite directions, of battery stack 10 to fasten end plates 3 to each other.

(Battery Cell 1)

Figure 4:
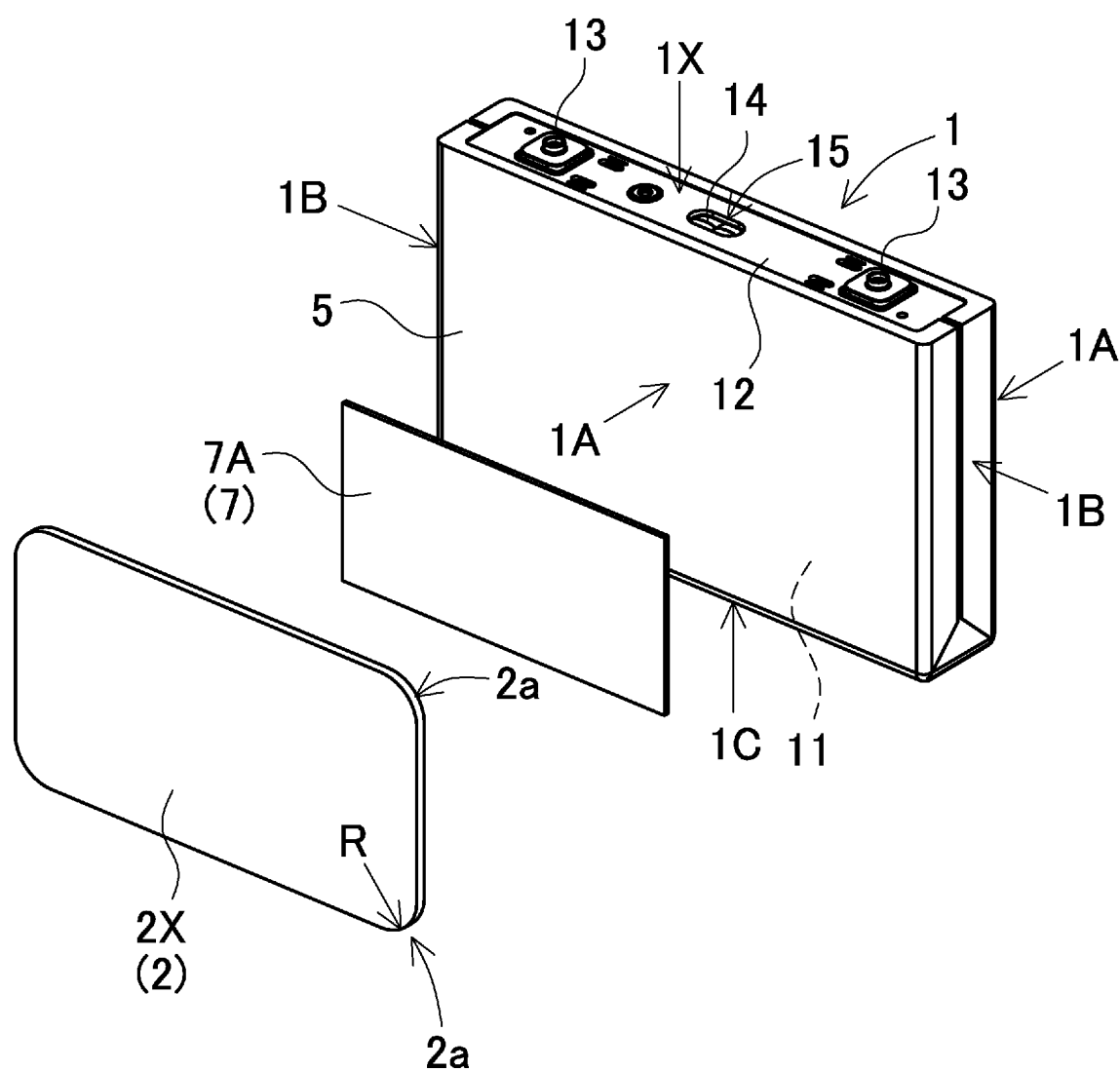
FIG. 4 is an exploded perspective view illustrating a stacked state of a battery cell and a separator.

As illustrated in FIG. 4, battery cell 1 is a prismatic battery. Main surface 1A, or a wider surface, of battery cell 1 has a quadrilateral outer shape. The thickness of battery cell 1 is smaller than the width of battery cell 1. Battery cell 1 is a non-aqueous electrolyte secondary battery such as a lithium-ion secondary battery. Power supply device 100 using lithium-ion secondary batteries as battery cells 1 can be made to have a large charging and discharging capacity with respect to volume and weight. Battery cells 1 are not limited to lithium-ion batteries. Any rechargeable battery such as a nickel-metal-hydride battery can also be used.

Battery cell 1 accommodates an electrode body constituted of stacked positive and negative electrode plates in exterior can 11, and is filled with an electrolyte and airtightly sealed. Exterior can 11 has a rectangular outer shape, has a pair of main surfaces 1A, and is formed in a rectangular cylindrical shape with a closed bottom, and an upper opening is airtightly closed by sealing plate 12 made of a metal sheet. Exterior can 11 is fabricated by deep-drawing a metal sheet of aluminum, aluminum alloy, or the like. Like exterior can 11, sealing plate 12 is fabricated from a metal sheet of aluminum or aluminum alloy. Sealing plate 12 is inserted in the opening of exterior can 11, and the boundary between the outer periphery of sealing plate 12 and the inner periphery of exterior can 11 is irradiated with a laser beam to fix sealing plate 12 to exterior can 11 in an airtight manner by laser welding.

In battery cell 1, sealing plate 12, which is an upper surface in the drawing, serves as terminal face 1X, and positive and negative electrode terminals 13 are fixed to both end parts of terminal face 1X. Electrode terminal 13 has a protrusion having a circular columnar shape. The protrusion is not necessarily required to have a circular columnar shape but may have a polygonal or an elliptic columnar shape. Sealing plate 12 is further provided with opening 15 for safety valve 14 between the positive and negative electrode terminals 13. When the internal pressure of battery cell 1 becomes higher than a set value, safety valve 14 opens to release the internal gas, thereby preventing an increase in the internal pressure of battery cell 1 as well as damage to exterior can 11 and sealing plate 12.

(Heat-Shrinkable Film 5)

Figure 5:
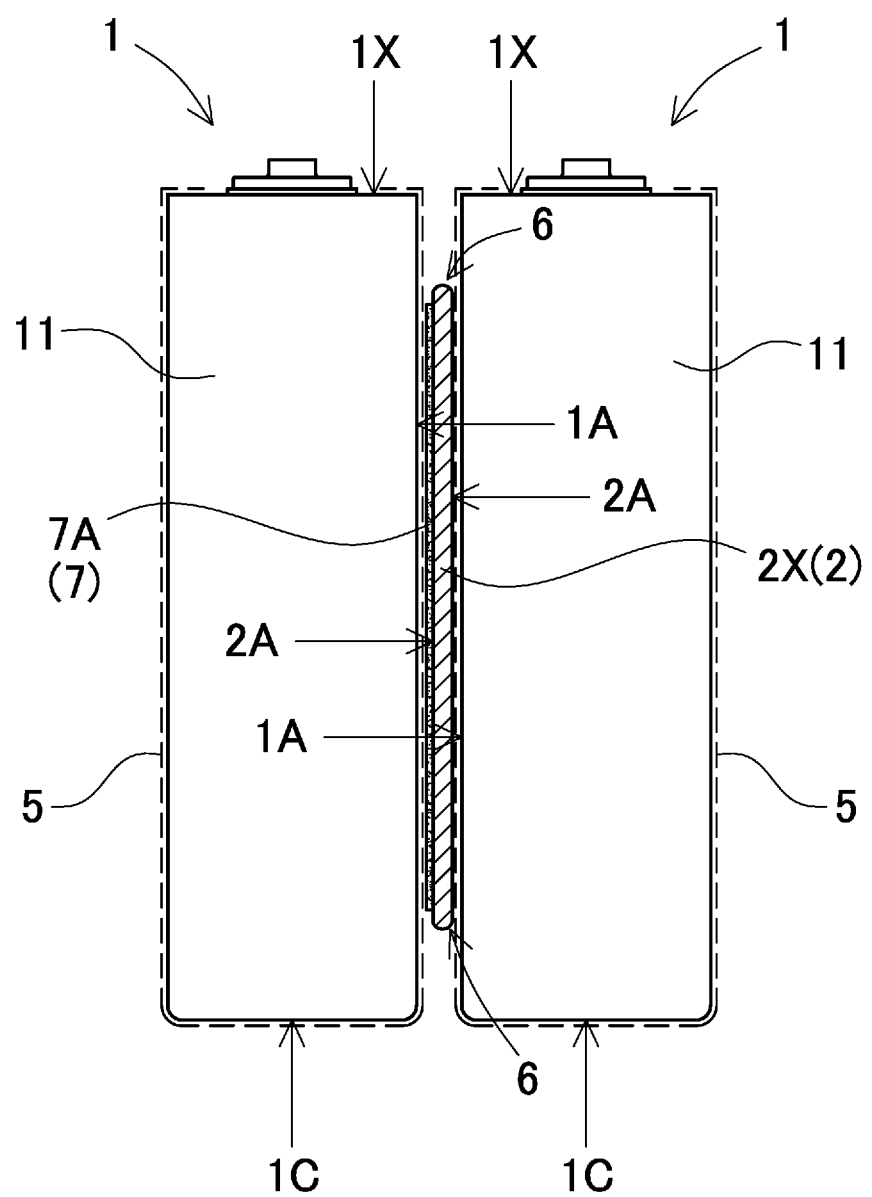
FIG. 5 is a vertical sectional view illustrating a stacked state of battery cells and a separator.
Figure 6:
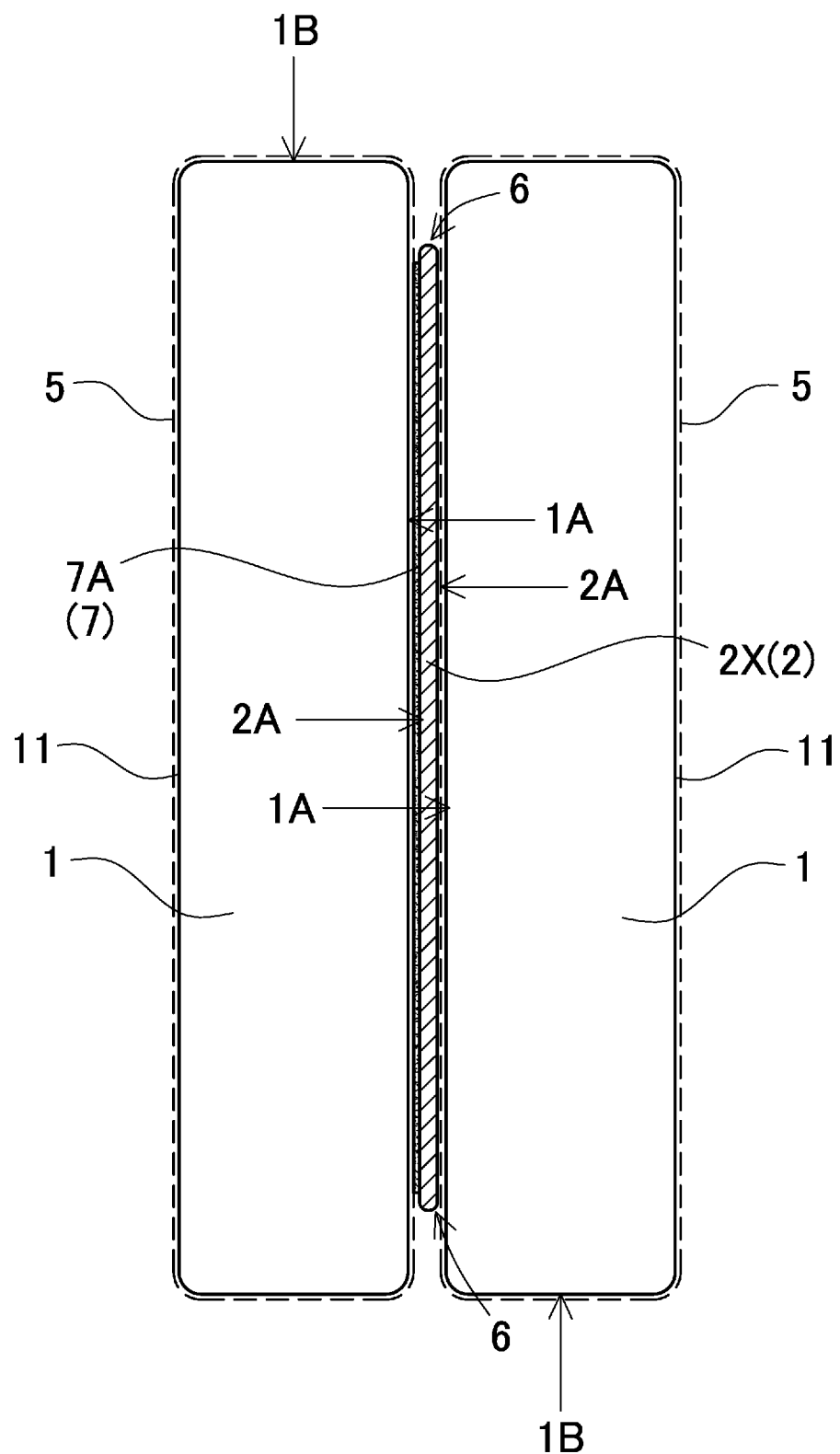
FIG. 6 is a horizontal sectional view illustrating a stacked state of battery cells and a separator.

Battery cell 1 illustrated in FIGS. 4 to 6 is insulated by insulating heat-shrinkable film 5 covering the outer peripheral surface of battery cell 1. Heat shrinkable film 5 covering the periphery of battery cell 1 is heated to thermally shrink, whereby heat-shrinkable film 5 is tightly fixed to the surface of battery cell 1. Heat-shrinkable film 5 illustrated in FIGS. 4 and 5 covers and insulates the surface of battery cell 1 except terminal face 1X, or the upper surface of battery cell 1. Specifically, the surface of battery cell 1 except the upper surface of battery cell 1 is covered, preferably, main surface 1A, side surfaces 1B, and bottom surface 1C are entirely covered. However, heat-shrinkable film 5 may cover the entire bottom surface, and parts of the main surface and the side surfaces except the upper parts thereof. The upper surface is not covered with heat-shrinkable film 5 because electrode terminals 13 need to be exposed for electrical connection.

A plastic film having a property of shrinking by heat treatment can be used as heat-shrinkable film 5. A film made of polyethylene terephthalate (PET) is suitable to be used as such a film. Heat-shrinkable film 5 made of PET is preferable because it is excellent in heat resistance and durability, is inexpensive, and can easily be bonded by thermal welding. The heat-shrinkable film is not limited to a film made of PET, and other plastic films having heat-shrinkable property and insulating property, for example, a film made of polyethylene (PE) can be used.

(Separator 2)

Separator 2 is disposed between stacked battery cells 1, insulates adjacent battery cells 1 from each other, and blocks heat transfer between battery cells 1. Separator 2 is entirely made of hybrid material 2X of an inorganic powder and a fibrous reinforcing material. The inorganic powder is preferably silica aerogel. In hybrid material 2X, fine silica aerogel having a low heat conductivity is filled in fine gaps between fibers. The carried silica aerogel is disposed in the gaps in the fibrous reinforcing material. Hybrid material 2X includes a fiber sheet made of a fibrous reinforcing material and silica aerogel having a nano-sized porous structure, and is manufactured by impregnating fibers with a gel raw material of the silica aerogel. After impregnating the fiber sheet with the silica aerogel, the fibers are stacked, reaction of the gel raw material is caused to form wet gel, and the surface of the wet gel is hydrophobized and then dried with hot air. The fibers of the fiber sheet is polyethylene terephthalate (PET). Alternatively, inorganic fibers such as flame-retardant oxidized acrylic fibers or glass wool can also be used as fibers of the fiber sheet.

The fibrous reinforcing material preferably has a fiber diameter of 0.1 μm to 30 μm inclusive. A fibrous reinforcing material having a fiber diameter smaller than 30 allowing small heat conduction in fibers, can improve the heat insulation characteristics of hybrid material 2X. The silica aerogel is inorganic fine particles including air by 90% to 98% inclusive, has fine pores between skeletons formed of a cluster of bonded spherical elements of a nano-order, and has a three-dimensional fine porous structure.

Hybrid material 2X of the silica aerogel and the fibrous reinforcing material is thin and has excellent heat insulation characteristics. Considering the energy generated by battery cell 1 that has fallen into thermal runaway, separator 2 made of hybrid material 2X is given a thickness that can prevent happening of thermal runaway of battery cell 1. A higher energy is generated by thermal runaway of battery cell 1 having a higher charge capacity. Thus, the thickness of separator 2 is set to an optimum value considering the charge capacity of battery cell 1. For example, for a power supply device in which a lithium ion secondary battery having a charge capacity of 5 Ah to 20 Ah is used as battery cell 1, hybrid material 2X is given a thickness of 0.5 mm to 3 mm inclusive, optimally about 1 mm to 2.5 mm inclusive. However, the present invention does not specify the thickness of hybrid material 2X within the above range. The thickness of hybrid material 2X is set to an optimum value considering the heat insulation characteristics provided by the fiber sheet and silica aerogel against thermal runaway, and the required heat insulation characteristics for preventing the battery cell falling into thermal runaway.

Furthermore, the hardness of separator 2 made of hybrid material 2X can be adjusted by the packing density of the silica aerogel filled in the fibrous reinforcing material. Hybrid material 2X can be made to have a high rigidity by increasing the packing density of silica aerogel, and a low rigidity by decreasing the packing density of silica aerogel. To have flexibility, hybrid material 2X used as separator 2 preferably has a low packing density of silica aerogel to have a low rigidity. As described above, decreasing the rigidity of hybrid material 2X makes separator 2 flexible and capable of deforming along with the deformation of expanding battery cell 1, and thus the damage to separator 2 can be avoided or suppressed.

Separator 2 illustrated in FIG. 4 is formed of hybrid material 2X that is shaped along the outer shape of main surface 1A of battery cell 1 to have a quadrangular shape having a size covering the central region of main surface 1A not including an outer peripheral edge part of main surface 1A. However, separator 2 may be sized and shaped to cover the entire main surface, or alternatively, cover a portion not including a portion of the outer peripheral edge part.

Separator 2 having a quadrangular outer shape as a whole has curved surfaces 2a on four corners. Forming the corner with curved surface 2a instead of an angular shape suppresses damage to heat-shrinkable film 5 caused by the corner making contact with heat-shrinkable film 5. The curvature radius (R) of curved surface 2a provided on the corner is preferably larger than the curvature radius of an R face formed on a corner of exterior can 11 of battery cell 1. Accordingly, even when the corner of separator 2 is disposed to oppose the corner of main surface 1A of battery cell 1, the corner of separator 2 is disposed further in the inner side than the corner of battery cell 1, so that the stress applied to heat-shrinkable film 5 can be reduced.

Figure 7:
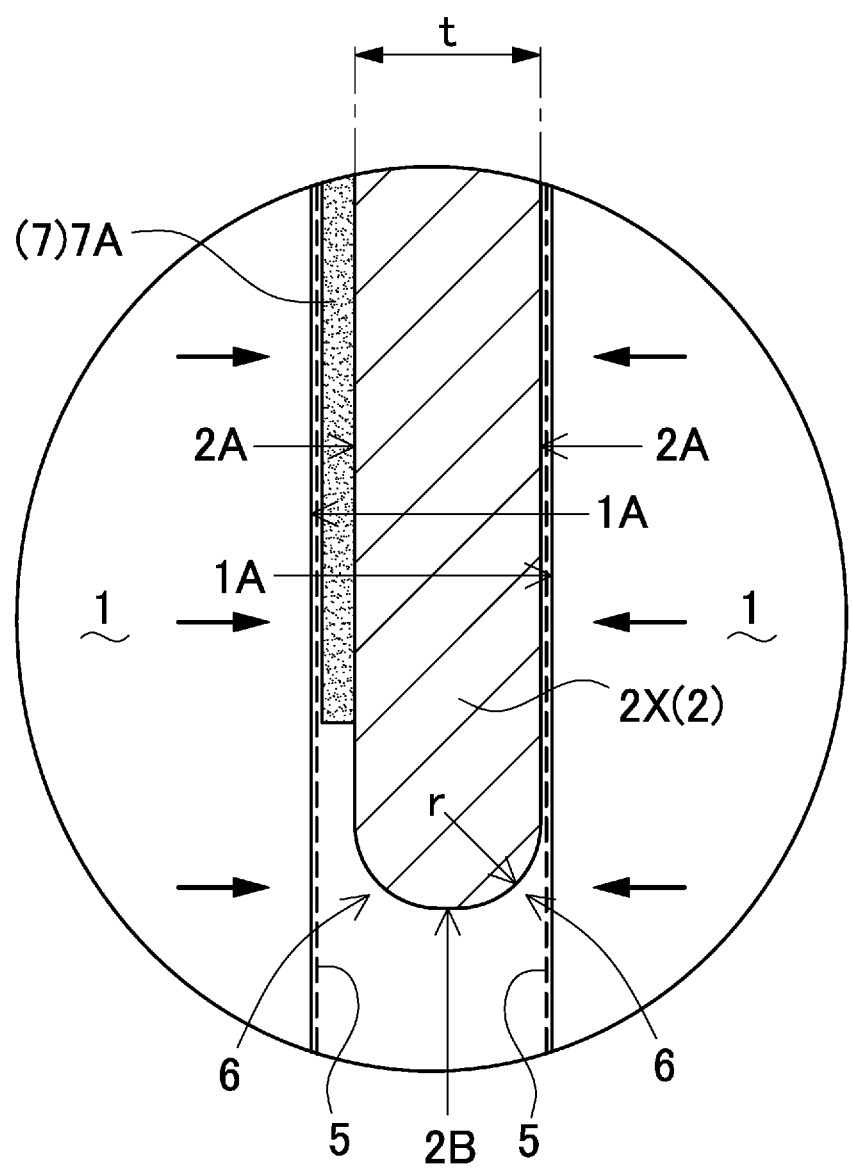
FIG. 7 is an enlarged sectional view of a main part, illustrating a stacked state of battery cells and a separator.

Furthermore, as illustrated in an enlarged sectional view in FIG. 7, the edge of an end edge of separator 2 is broken to provide broken edge 6. Separator 2 illustrated in the drawing is provided with broken edges 6 by breaking corner parts which are each a boundary between end face 2B, which is the outer peripheral surface, and stack plane 2A. Hybrid material 2X containing silica aerogel, which is an inorganic powder, may have a sharp edge on a cut surface at an end edge, and may have exposure of inorganic powder contained in the hybrid material 2X. Such a sharp edge or exposed inorganic powder might come into contact with heat-shrinkable film 5 and cause a rupture. Thus, breaking the edge of the end edge of hybrid material 2X suppresses damage cause by contact between hybrid material 2X and heat-shrinkable film 5, and can effectively prevent a rupture of heat-shrinkable film 5.

Separator 2 illustrated in FIGS. 5 to 7 is disposed between adjacent battery cells 1 with heat-shrinkable films 5 opposing stack planes 2A on both sides of separator 2. Separator 2 of which stack planes 2A on both sides contact heat-shrinkable films 5 as illustrated in FIG. 7 is provided with broken edges 6 formed by breaking the edges on both sides of end face 2B. Separator 2 illustrated in the drawing is provided with broken edges 6 by a process of creating R faces on the edge. With this structure, the state of contact with heat-shrinkable film 5 can be adjusted by adjusting the curvature radius (r) of the R face created by processing. Broken edges 6 having the R faces created by processing on both sides of end face 2B preferably have curvature radii (r) of 20% to 50%, inclusive, of the thickness (t) of separator 2. For example, when the thickness (t) of separator 2 is 1 mm, the curvature radius (r) of broken edges 6 formed on both surfaces is 0.2 mm to 0.5 mm inclusive. However, the separator can be provided with broken edge 6 by forming a C face by processing the edge. Separator 2 illustrated in FIGS. 5 and 6 is provided with broken edges 6 along the entire outer peripheral edge. As described above, the structure provided with broken edges 6 on the entire outer peripheral edge can effectively prevent a rupture of heat-shrinkable film 5 that comes into contact with separator 2.

Separator 2 described above is bonded via adhesive layer 7 to main surface 1A of battery cell 1 covered with heat-shrinkable film 5. Adhesive layer 7 is a member for bonding separator 2 to heat-shrinkable film 5 tightly attached to the surface of battery cell 1. An adhesive or a bonding agent can be used as adhesive layer 7. That is, in the present specification, the term "bonding" has a broad meaning including sticking. A member having a higher flexibility and stretchability than separator 2 is used for adhesive layer 7. This is because adhesive layer 7 having flexibility and stretchability allows separator 2 to deform along with deformation of expanding battery cell 1, thereby avoiding or suppressing a rupture of separator 2 fixed by adhesive layer 7. As an adhesive, for example, a urethane-based or silicon-based adhesive can be used. As a bonding layer, for example, a double-sided tape can be used. FIG. 4 illustrates bonding of separator 2 to main surface 1A of battery cell 1 via double-sided tape 7A as adhesive layer 7.

In power supply device 100 described above, battery cell 1 is a prismatic battery cell having a charge capacity of 6 Ah to 10 Ah inclusive, and hybrid material 2X of separator 2 is "NASBIS (registered trademark) manufactured by Panasonic Corporation" in which a fiber sheet is filled with silica aerogel and has a thickness of 1 mm. Power supply device 100 forces a specific one of battery cells 1 to fall into thermal runaway to prevent causing of thermal runaway of adjacent battery cell 1.

(Battery Stack 10)

The plurality of battery cells 1 each covered with heat-shrinkable film 5 are stacked with separators 2 each interposed between adjacent battery cells 1 to form battery stack 10. As illustrated in FIGS. 5 and 6, separator 2 sandwiched between adjacent battery cells 1 is stacked such that one of stack planes 2A is bonded to heat-shrinkable film 5 covering battery cell 1 via adhesive layer 7 and the other stack plane 2A is in surface contact with heat-shrinkable film 5 covering battery cell 1, whereby battery stack 10 is formed.

In battery stack 10, the plurality of battery cells 1 are stacked such that terminal faces 1X provided with positive and negative electrode terminals 13, or sealing plates 12 in FIG. 1, are flush with one another. In battery stack 10, a metal bus bar (not shown) is connected to positive and negative electrode terminals 13 of adjacent battery cells 1, and the plurality of battery cells 1 are connected in series or in parallel, or in series and parallel by the bus bars. The battery cells connected in series, in which a potential difference occurs between the exterior cans, are insulated from each other by a separator interposed between the battery cells. For the battery cells connected in parallel, in which no potential difference occur between the exterior cans, the separator interposed between the battery cells heat-insulates the battery cells from each other to prevent causing of thermal runaway. In battery stack 10 illustrated in the drawing, 12 battery cells 1 are connected in series. However, the present invention does not limit the number and the state of connection of battery cells 1 constituting battery stack 10.

(Another Example of Disposing Separator 2)

Figure 8:
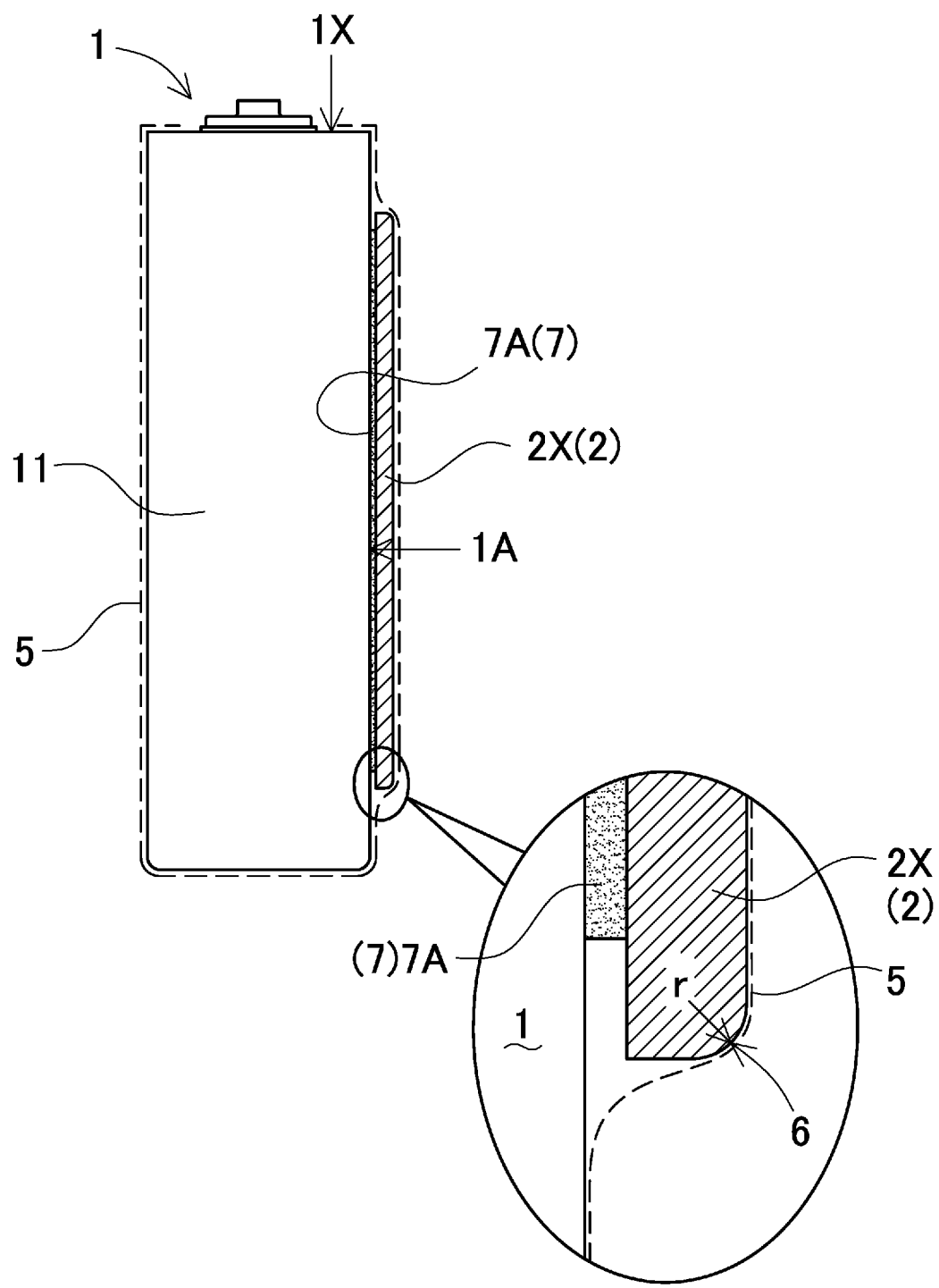
FIG. 8 is a cross-sectional view illustrating another example of a stacked state of a battery cell and a separator.

Separator 2 described above is stacked between adjacent battery cells 1 and in the outer side of battery cells 1 covered with heat-shrinkable films 5. In other words, separator 2 is stacked over an outer side surface of heat shrinkable film 5 covering battery cell 1. Alternatively, as illustrated in FIG. 8, separator 2 can be disposed in the inner side of heat-shrinkable film 5 covering battery cell 1. In battery cell 1 illustrated in FIG. 8, separator 2 is bonded and fixed to the surface of exterior can 11, and battery cell 1 to which separator 2 is fixed is covered with heat-shrinkable film 5 that has thermally shrunk so as to be in tight contact with the surface of separator 2.

As described above, separator 2 disposed in the inner side of heat-shrinkable film 5 covering battery cell 1 is also provided with broken edge 6 by breaking the edge of an end edge of stack plane 2A opposing heat-shrinkable film 5. Since one of the stack planes 2A of separator 2 is in tight contact with the surface of battery cell 1, the edge of the stack plane 2A that is in tight contact with battery cell 1 needs not be broken. Broken edge 6 is provided at least on the edge of the stack plane 2A that is in tight contact with heat-shrinkable film 5. For separator 2 provided with broken edge 6 only on one side surface as described above, broken edge 6 can be processed into an R face having a large curvature radius (r). Separator 2 can be given broken edge 6 having a curvature radius (r) of, for example, 20% to 100% of the thickness (t) of separator 2. However, the separator disposed in the inner side of heat-shrinkable film may be provided with broken edges on both surfaces. Furthermore, the broken edge may be formed by processing to have a C face.

This separator 2 also has a quadrangular outer shape along main surface 1A of battery cell 1, and has curved surfaces on four corners. The curved surfaces suppress damage to heat-shrinkable film 5 caused by contact between the corners and heat-shrinkable film 5. In particular, in the structure in which separator 2 is disposed in the inner side of heat-shrinkable film 5, the pressing force that is created by thermally shrinking heat-shrinkable film 5 to bring separator 2 into tight contact with the surface of battery cell 1 is also applied to separator 2. The synergistic effect of the large curvature radius (r) of broken edge 6 and the curved surfaces on the corners can further effectively protect heat-shrinkable film 5.

As described above, battery cells 1 each covered with heat-shrinkable film 5 that has heat-shrunk with separator 2 contained in the inner side are stacked with separator 2 interposed between adjacent battery cells 1 to form battery stack 10.

(End Plate 3)

As illustrated in FIGS. 1 to 3, end plates 3 are disposed at both ends of battery stack 10, sandwiching battery stack 10 from both ends. End plate 3 has a quadrangular shape having substantially the same shape and dimensions as those of the outer shape of battery cell 1, and is entirely made of metal. Metal end plates 3 can achieve excellent strength and durability. A pair of end plates 3 disposed at both ends of battery stack 10 are fastened via a plurality of bind bars 4 disposed along both side surfaces of battery stack 10.

(Bind Bar 4)

Bind bars 4 are disposed on both side surfaces, facing opposite directions, of battery stack 10 to fasten the pair of end plates 3 disposed on both end faces of battery stack 10. As illustrated in FIGS. 1 and 2, bind bars 4 extend in the stacking direction of battery stack 10, and fix the pair of end plates 3 at a predetermined distance therebetween to fix battery cells 1 stacked between end plates 3 in a predetermined compressed state. Bind bar 4 is a metal sheet having a predetermined width and a predetermined thickness and disposed along a side surface of battery stack 10. A metal sheet that withstands a high tensile force is used as bind bar 4. Bind bar 4 in the drawing is a metal sheet having a width in the vertical direction and covering a side surface of battery stack 10. Bind bar 4 is made by bending a metal sheet into a predetermined shape by press forming or the like. Upper and lower end edge parts of bind bar 4 illustrated in the drawing are bent by processing to form bent parts 4a. Upper and lower bent parts 4a located at the right and left side surfaces of battery stack 10 are shaped to cover portions of upper and lower surfaces of battery stack 10 from corners of battery stack 10. Bind bars 4 illustrated in the drawing are fixed to both side surfaces of end plates 3 via a plurality of fixing pins.

The power supply device described above can be used as a power source for a vehicle to supply power to a motor that makes an electric vehicle travel. An electric vehicle on which a power supply device is mounted may be an electric vehicle such as a hybrid car or a plug-in hybrid car that travels by both an engine and a motor, or an electric car that travels only by a motor can be used. The power supply device is used as a power source for these vehicles. As an example, power supply device 100 having a high capacity and a high output configured by connecting a large number of the above-described power supply devices in series or in parallel to obtain electric power for driving a vehicle, and by further adding a necessary controlling circuit, will be described.

(Power Supply Device for Hybrid Vehicle)

Figure 9:
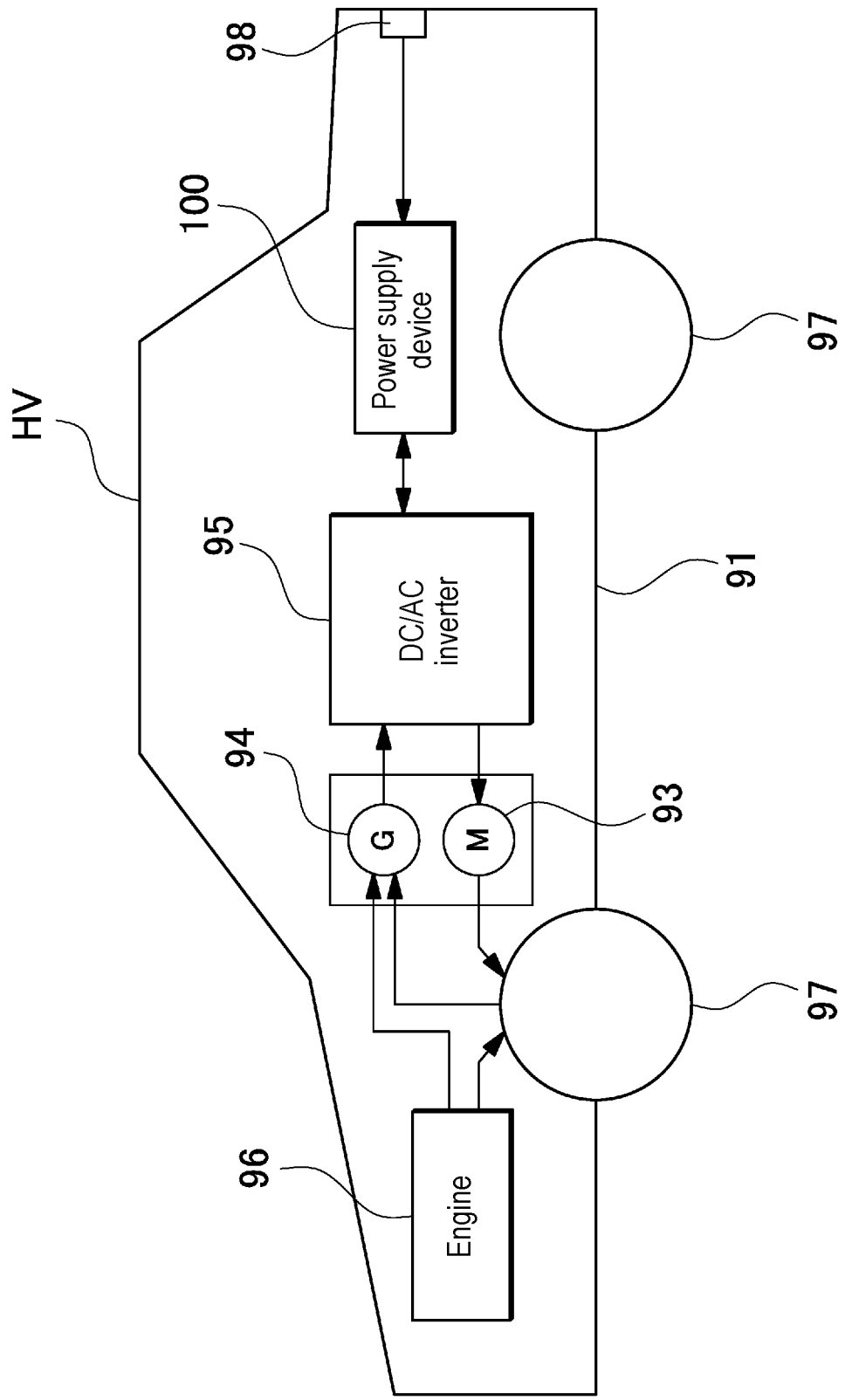
FIG. 9 is a block diagram illustrating an example in which a power supply device is mounted on a hybrid car that travels by an engine and a motor.

FIG. 9 illustrates an example in which a power supply device is mounted on a hybrid car that is made to travel by both an engine and a motor. Vehicle HV on which the power supply device is mounted, as illustrated in the drawing, includes vehicle body 91, engine 96, motor 93 for traction, engine 96 and motor 93 being configured to make vehicle body 91 travel, wheels 97 that are driven by engine 96 and motor 93 for traction, power supply device 100 that supplies power to motor 93, and generator 94 that charges a battery of power supply device 100. Power supply device 100 is connected to motor 93 and generator 94 via DC/AC inverter 95. Vehicle HV travels by both motor 93 and engine 96 while performing charging and discharging of the battery of power supply device 100. Motor 93 is driven in a travel range where the engine efficiency is low, for example, during acceleration or low-speed travelling, to make the vehicle travel. Motor 93 is driven by power supplied from power supply device 100. Generator 94 is driven by engine 96 or by regenerative braking generated by applying braking to the vehicle, and charges the battery of power supply device 100. As illustrated in FIG. 9, vehicle HV may include charging plug 98 for charging power supply device 100. Power supply device 100 can be charged by connecting charging plug 98 to an external power source.

(Power Supply Device for Electric Car)

Figure 10:
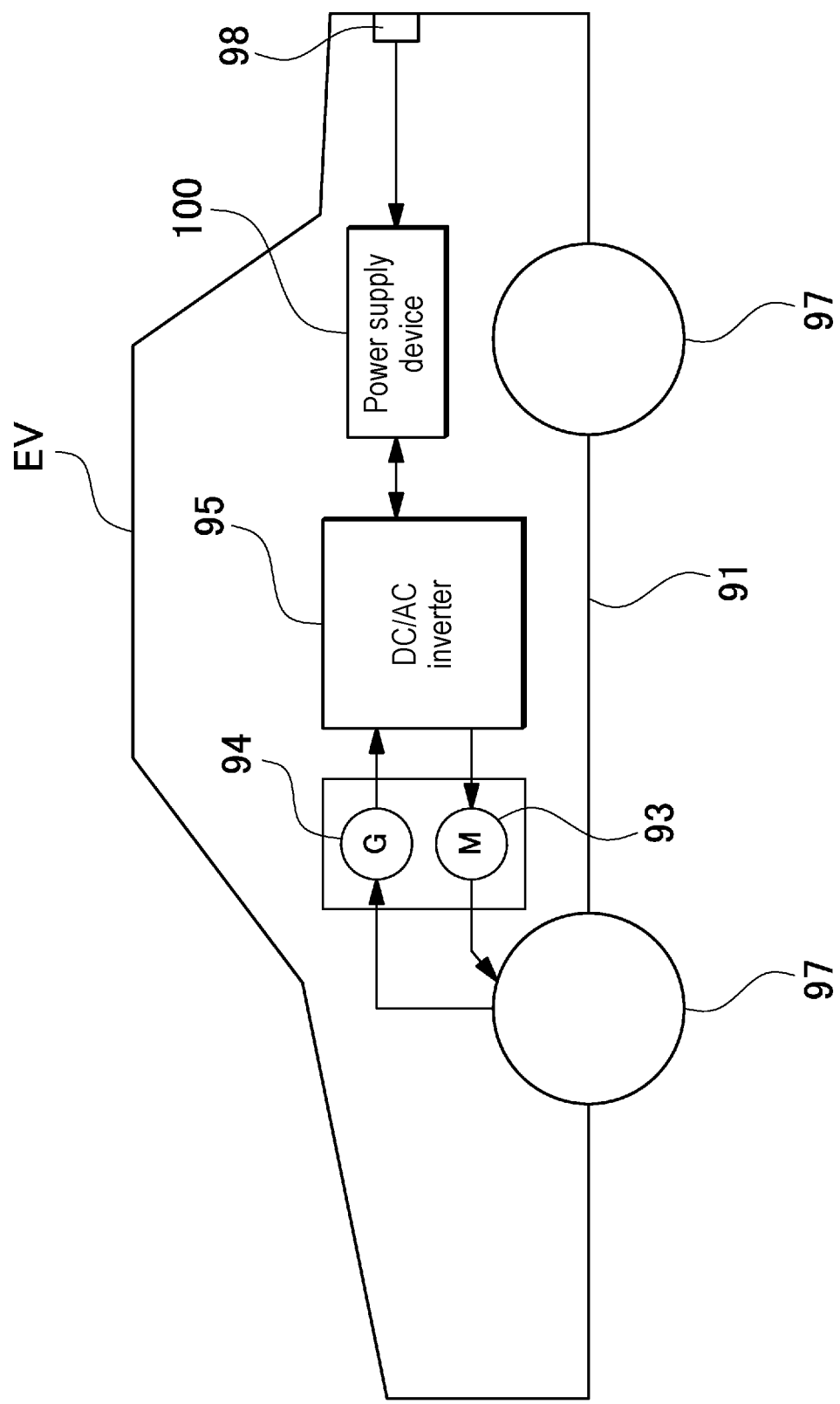
FIG. 10 is a block diagram illustrating an example in which a power supply device is mounted on an electric car that travels only by a motor.

Furthermore, FIG. 10 illustrates an example in which the power supply device is mounted on an electric car that travels only by a motor. Vehicle EV illustrated in the drawing on which the power supply device is mounted includes vehicle body 91, motor 93 for traction to make vehicle body 91 travel, wheels 97 driven by motor 93, power supply device 100 that supplies power to motor 93, and generator 94 that charges a battery of power supply device 100. Power supply device 100 is connected to motor 93 and generator 94 via DC/AC inverter 95. Motor 93 is driven by power supplied from power supply device 100. Generator 94 is driven by energy produced by regenerative braking of vehicle EV to charge the battery of power supply device 100. Vehicle EV includes charging plug 98. Power supply device 100 can be charged by connecting charging plug 98 to an external power source.

(Power Supply Device for Power Storage Device)

Figure 11:
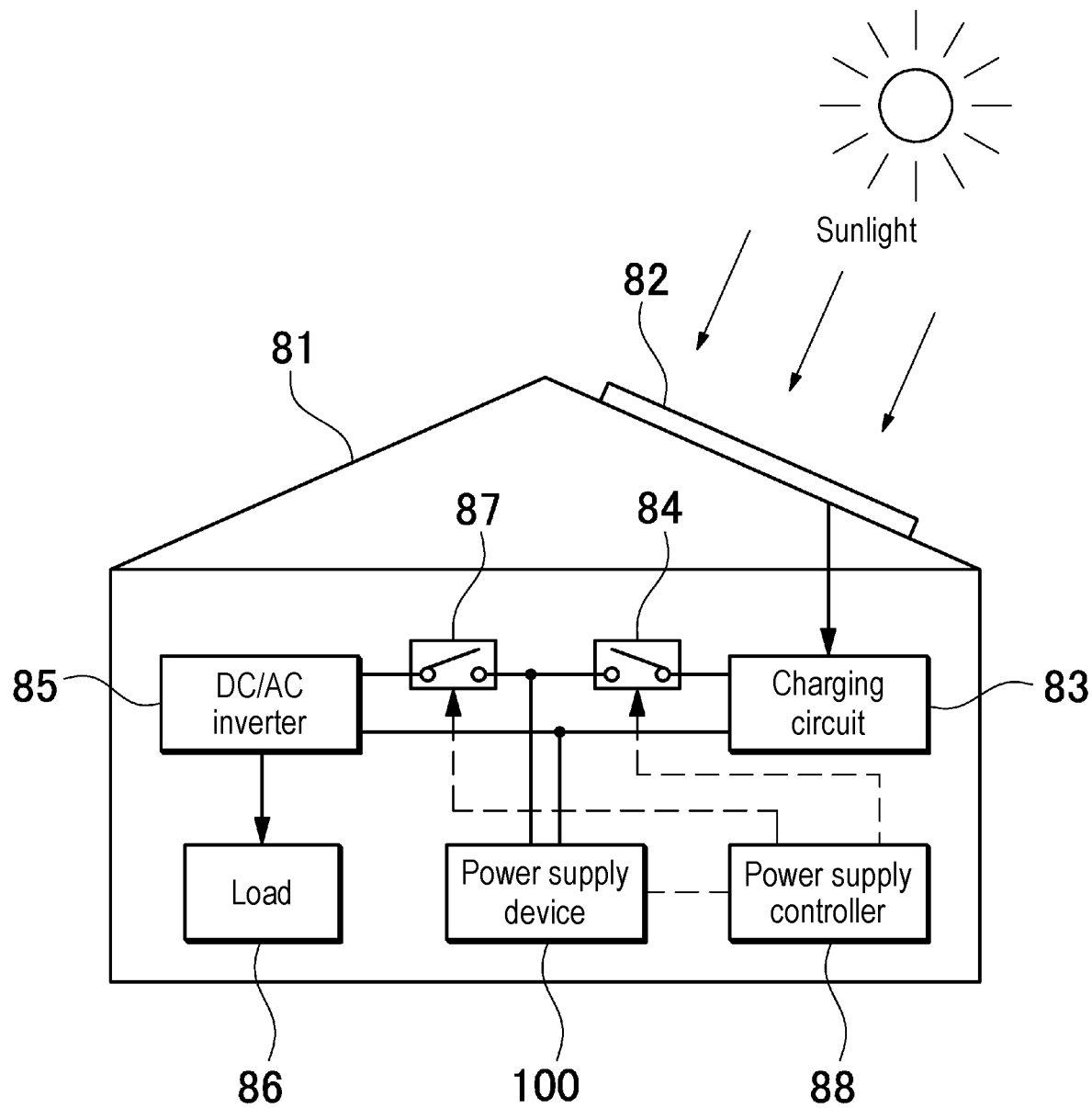
FIG. 11 is a block diagram illustrating an example application for a power supply device for power storage.
Figure 12:
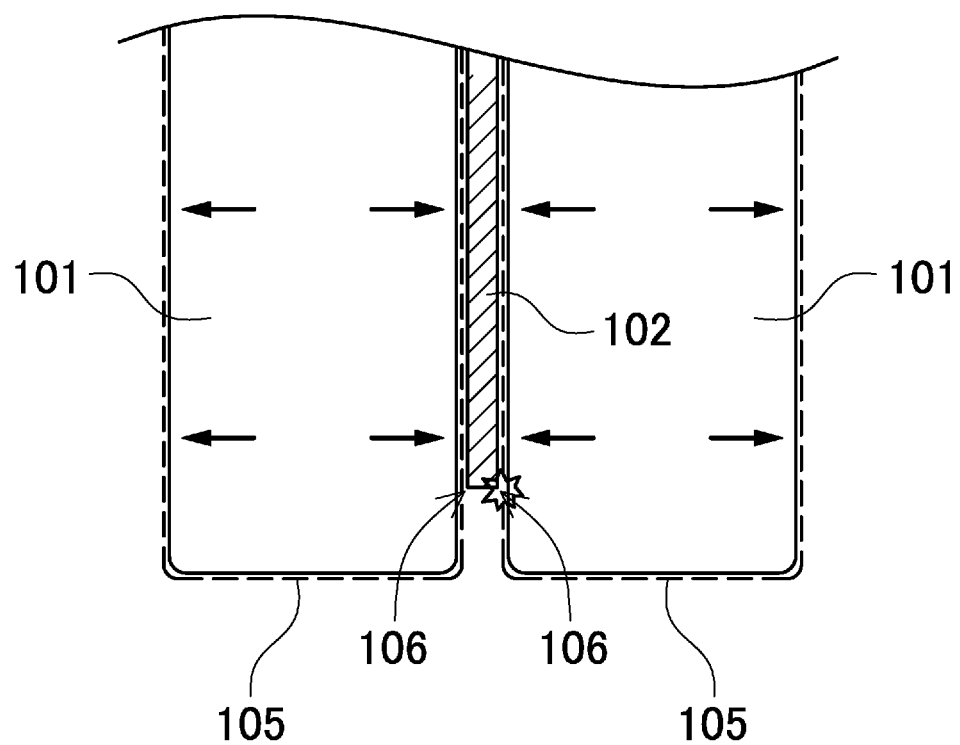
FIG. 12 is a cross-sectional view illustrating a conventional stacked state of a separator and battery cells.

The present invention does not limit application of the power supply device to a power source for a motor that makes a vehicle travel. The power supply device according to the exemplary embodiment can be used as a power source for a power storage device that stores electricity by charging a battery with power generated by solar power generation, wind power generation, or the like. FIG. 11 illustrates a power storage device that stores electricity by charging a battery of power supply device 100 by solar cell 82.

The power storage device illustrated in FIG. 11 charges the battery of power supply device 100 with power generated by solar cell 82 disposed on a roof, a rooftop, or the like of building 81 such as a house or a factory. In this power storage device, the battery of power supply device 100 is charged by charging circuit 83 using solar cell 82 as a charging power source, and power is supplied to load 86 via DC/AC inverter 85. The power storage device has a charge mode and a discharge mode. In the power storage device illustrated in the drawing, DC/AC inverter 85 and charging circuit 83 are connected to power supply device 100 respectively via discharging switch 87 and charging switch 84. ON/OFF of discharging switch 87 and charging switch 84 is switched by power supply controller 88 of the power storage device. In the charge mode, power supply controller 88 switches charging switch 84 to ON and discharging switch 87 to OFF to permit charging of power supply device 100 through charging circuit 83. When charging is completed and the battery is fully charged or when the battery is charged to a predetermined level or higher, power supply controller 88 turns off charging switch 84 and turns on discharging switch 87, thereby switching to the discharge mode to permit power supply device 100 to discharge electricity to load 86. When necessary, it is also possible to simultaneously perform power supply to load 86 and charging of power supply device 100 by turning on both charging switch 84 and discharging switch 87.

Although not illustrated in the drawing, the power supply device can also be used as a power source for a power storage device that stores electricity by charging a battery using midnight power at night. The power supply device charged by midnight power can limit peak power consumption in the daytime at a low level by such a manner that charging is performed with midnight power, which is surplus power at power plants, and power is output during the daytime, when power loads are high. The power supply device can also be used as a power source that is charged with both output power of a solar cell and midnight power. This power supply device can efficiently store electricity by effectively using both power generated by a solar cell and midnight power, considering weather and power consumption.

The power storage device described above can be suitably used for applications such as a backup power supply device that can be mounted on a rack of a computer server, a backup power supply device for a radio base station of cellular phones or the like, a power source for storing electricity for home and factory use, a power storage device used in combination with a solar cell, such as a power source for street lamps, and a backup power source for traffic lights, traffic indicators on roads, and the like.

INDUSTRIAL APPLICABILITY

The power supply device according to the present invention can be suitably used as a power source for a large current used, for example, for a power source of a motor for driving an electric vehicle such as a hybrid car, a fuel cell car, an electric car, an electric motorcycle, or the like. Examples of the power supply device include a power supply device for a plug-in hybrid electric car and a hybrid electric car capable of switching a traveling mode between an EV traveling mode and an HEV traveling mode, and an electric car. For example, the power supply device can also be appropriately used for the following applications: a backup power supply device that can be mounted in a rack of a computer server; a backup power supply device used for a radio base station of cellular phones or the like; a power source for storing electricity for home and factory use; a power storage device used in combination with a solar cell, such as a power source for street lights; and a backup power source for traffic lights and the like.

REFERENCE MARKS IN THE DRAWINGS

100: power supply device
1: battery cell
1X: terminal face
1A: main surface
1B: side surface
1C: bottom surface
2: separator
2X: hybrid material
2A: stack plane
2B: end face
2a: curved surface
3: end plate
4: bind bar
4a: bent part
5: heat-shrinkable film
6: broken edge
7: adhesive layer
7A: double-sided tape
10: battery stack
11: exterior can
12: sealing plate
13: electrode terminal
14: safety valve
15: opening
81: building
82: solar cell
83: charging circuit
84: charging switch
85: DC/AC inverter
86: load
87: discharging switch
88: power supply controller
91: vehicle body
93: motor
94: generator
95: DC/AC inverter
96: engine
97: wheel
98: charging plug
HV, EV: vehicle
101: battery cell
102: heat insulating material
105: heat-shrinkable film
106: edge

The invention claimed is:

1. A power supply device comprising:
a plurality of battery cells each including a prismatic exterior can;
heat-shrinkable films including insulating property and each covering a corresponding one of the plurality of battery cells;
a plurality of separators each interposed between a corresponding adjacent pair of the plurality of battery cells;
a battery stack including the plurality of battery cells stacked with the plurality of separators;
a pair of end plates disposed on both end faces of the battery stack;
a plurality of bind bars disposed on side surfaces of the battery stack, the side surfaces facing each other, the plurality of bind bars each fastening the end plates to each other, wherein the plurality of separators each having an end including a broken edge wherein the broken edge is curved and has a curvature radius of 20% to 100% of a thickness of a corresponding separator of said plurality of separators, and wherein each of the plurality of separators is disposed in an inner side of a heat-shrinkable film covering each of the corresponding adjacent pair of the plurality of battery cells, the heat-shrinkable film being among the heat-shrinkable films.

2. The power supply device according to claim 1, wherein each of the plurality of separators is sandwiched and fixed between the corresponding adjacent pair of the plurality of battery cells, and each of the plurality of separators includes the broken edge along an outer peripheral edge of a stack plane on both sides of the separator.

3. The power supply device according to claim 1, further comprising an adhesive layer provided between each of the plurality of separators and each of the corresponding adjacent pair of the plurality of battery cells opposing the separator, wherein the adhesive layer is made of a material having higher flexibility and stretchability than the separator.

4. The power supply device according to claim 1, wherein at least one of the plurality of separators is made of a hybrid material of an inorganic powder and a fibrous reinforcing material.

5. The power supply device according to claim 4, wherein the inorganic powder is silica aerogel.

6. An electric vehicle equipped with the power supply device according to claim 1, the electric vehicle comprising:

the power supply device;

a motor for traction, power being supplied to the motor from the power supply device;

a vehicle body with the power supply device and the motor mounted on the vehicle body; and wheels driven by the motor to cause the vehicle body travel.

7. A power storage device equipped with the power supply device according to claim 1, the power storage device comprising:

the power supply device; and a power supply controller configured to control charging and discharging of the power supply device, wherein the power supply controller enables charging of at least one of the plurality of battery cells with power from an external source and controls charging of at least one of the plurality of battery cells.

8. The power supply device according to claim 1, wherein the curvature radius is 20% to 50% of the thickness of the corresponding separator of said plurality of separators.

* * * * *